United States Patent
Liang (10) Patent No.: US 10,771,385 B2
(45) Date of Patent: Sep. 8, 2020

(54) PACKET FORWARDING METHOD AND PORT EXTENDER

(71) Applicant: NEW H3C TECHNOLOGIES CO., LTD., Hangzhou (CN)

(72) Inventor: Xuewei Liang, Beijing (CN)

(73) Assignee: NEW H3C TECHNOLOGIES CO., LTD., Hangzhou (CN)

(*) Notice: Subject to any disclaimer, the term of this patent is extended or adjusted under 35 U.S.C. 154(b) by 0 days.

(21) Appl. No.: 16/099,677

(22) PCT Filed: Jun. 20, 2017

(86) PCT No.: PCT/CN2017/089147
§ 371 (c)(1),
(2) Date: Nov. 7, 2018

(87) PCT Pub. No.: WO2017/219958
PCT Pub. Date: Dec. 28, 2017

(65) Prior Publication Data
US 2019/0158401 A1    May 23, 2019

(30) Foreign Application Priority Data
Jun. 21, 2016   (CN) .......................... 2016 1 0464540

(51) Int. Cl.
*H04L 12/741*   (2013.01)
*H04L 12/931*   (2013.01)
(Continued)

(52) U.S. Cl.
CPC ........ *H04L 45/745* (2013.01); *H04L 12/4641* (2013.01); *H04L 45/02* (2013.01);
(Continued)

(58) Field of Classification Search
None
See application file for complete search history.

(56) References Cited

U.S. PATENT DOCUMENTS

2012/0287930 A1   11/2012   Raman
2014/0003428 A1   1/2014    Li et al.
(Continued)

FOREIGN PATENT DOCUMENTS

CN   102148749 A   8/2011
CN   104092595 A   10/2014
(Continued)

OTHER PUBLICATIONS

ISA State Intellectual Property Office of the People's Republic of China, International Search Report Issued in Application No. PCT/CN2017/089147, dated Sep. 1, 2017, WIPO, 4 pages.
(Continued)

*Primary Examiner* — Anh Ngoc M Nguyen
(74) *Attorney, Agent, or Firm* — McCoy Russell LLP (57) ABSTRACT

A PE and a method of forwarding packet are provided. According to an example of the method, when receiving a packet, the PE may determine a vPort associated to a port through which the packet is received. When a forwarding entry adding condition is satisfied, the PE may add a first forwarding entry in a forwarding table by recording the first vPort as an egress port, a source MAC address of the packet as a MAC address and an VLAN identifier of the VLAN associated with the first vPort as a VLAN identifier. Subsequently, the PE may search the forwarding table for a second forwarding entry matching the destination MAC address of the packet and the VLAN to which the packet belongs. The PE may search a port associating relationship table for a port associated to a second vPort in the second forwarding entry to forward the packet.

12 Claims, 4 Drawing Sheets

(51) Int. Cl.
*H04L 12/751* (2013.01)
*H04L 12/721* (2013.01)
*H04L 12/46* (2006.01)
*H04L 12/947* (2013.01)
*H04L 12/935* (2013.01)
*H04L 29/12* (2006.01)

(52) U.S. Cl.
CPC .............. *H04L 45/66* (2013.01); *H04L 49/25* (2013.01); *H04L 49/30* (2013.01); *H04L 49/70* (2013.01); *H04L 61/6022* (2013.01)

(56) References Cited

U.S. PATENT DOCUMENTS

| | | | |
|---|---|---|---|
| 2014/0177641 A1 | 6/2014 | Kalkunte et al. | |
| 2014/0269710 A1* | 9/2014 | Sundaram | H04L 45/302 370/392 |
| 2015/0163072 A1* | 6/2015 | Kalkunte | H04L 12/4633 370/392 |

FOREIGN PATENT DOCUMENTS

| | | | | |
|---|---|---|---|---|
| CN | 105227464 A | 1/2016 | | |
| EP | 2533472 A1 | 12/2012 | | |
| EP | 2670090 A1 * | 12/2013 | ............. | H04L 45/24 |
| JP | 2005151025 A | 6/2005 | | |
| JP | 2007235302 A | 9/2007 | | |
| JP | 2014510483 A | 4/2014 | | |
| JP | 2014519249 A | 8/2014 | | |

OTHER PUBLICATIONS

"IEEE Standard for Local and metropolitan area networks—Virtual Bridged Local Area Networks—Bridge Port Extension," IEEE Website, Available Online at https://ieeexplore.ieee.org/document/6239543, Jul. 16, 2012, 136 pages.
ISA State Intellectual Property Office of the People's Republic of China, Written Opinion of the International Searching Authority Issued in Application No. PCT/CN2017/089147, dated Sep. 1, 2017, WIPO, 4 pages.
European Patent Office, Extended European Search Report Issued in Application No. 17814696.5, dated Apr. 11, 2019, Germany, 14 pages.
State Intellectual Property Office of the People's Republic of China, Office Action and Search Report Issued in Application No. 201610464540.4, dated Jul. 2, 2019, 16 pages. (Submitted with Partial Translation).
Japanese Patent Office, Office Action Issued in Application No. 2018-566849, dated Dec. 3, 2019, 3 pages. (Submitted with Machine Translation).
State Intellectual Property Office of the People's Republic of China, Office Action and Search Report Issued in Application No. 201610464540.4, dated Mar. 2, 2020, 15 pages. (Submitted with Machine Translation).
European Patent Office, Office Action Issued in Application No. 17814696.5, dated Jul. 20, 2020, Netherlands, 9 pages.

* cited by examiner

PACKET FORWARDING METHOD AND PORT EXTENDER

CROSS REFERENCE TO RELATED APPLICATIONS

This present application is a U.S. National Phase of International Patent Application Serial No. PCT/CN2017/089147 entitled "PACKET FORWARDING," filed on Jun. 20, 2017. International Patent Application Serial No. PCT/CN2017/089147 claims priority to Chinese Patent Application No. 201610464540.4 filed on Jun. 21, 2016. The entire contents of each of the above-cited applications are hereby is incorporated by reference in their entirety for all purposes.

BACKGROUND 802.1BR defines that a switch with port expanding capability may consist of a Controlling Bridge (CB) and a plurality of Port Extenders (PEs) which connected with each other in a tree manner. The PEs are configured to expand port quantity and port accessing capability for the CB. For example, a PE may be connected with a CB or an upper PE through an upstream port, and connected with a lower PE through a cascade port. Two PEs may be cascaded with each other. For example, a CB may be connected with a plurality of PEs through cascade ports and configured to manage Virtual Port (vPort) mapping for ports on the PEs. For forwarding a packet, the PE may load an Ethernet-Tag (E-TAG) carrying an E-Tag Channel Identifier (ECID) associated to a source port through which the packet is received into the packet and then send the packet to the CB, so that the CB may decide how to forward the packet.

DETAILED DESCRIPTION OF THE EMBODIMENTS

The technical solution in the embodiments of the present disclosure will be described clearly and completely in conjunction with the accompanying drawings in the embodiments of the present disclosure. It will be apparent that the described embodiments are merely a part of the embodiments rather than all the embodiments of the present disclosure. Based on the embodiments of the present disclosure, all other embodiments obtained by those skilled in the art without making creative work are within the scope of protection of the present disclosure.

Figure 1:
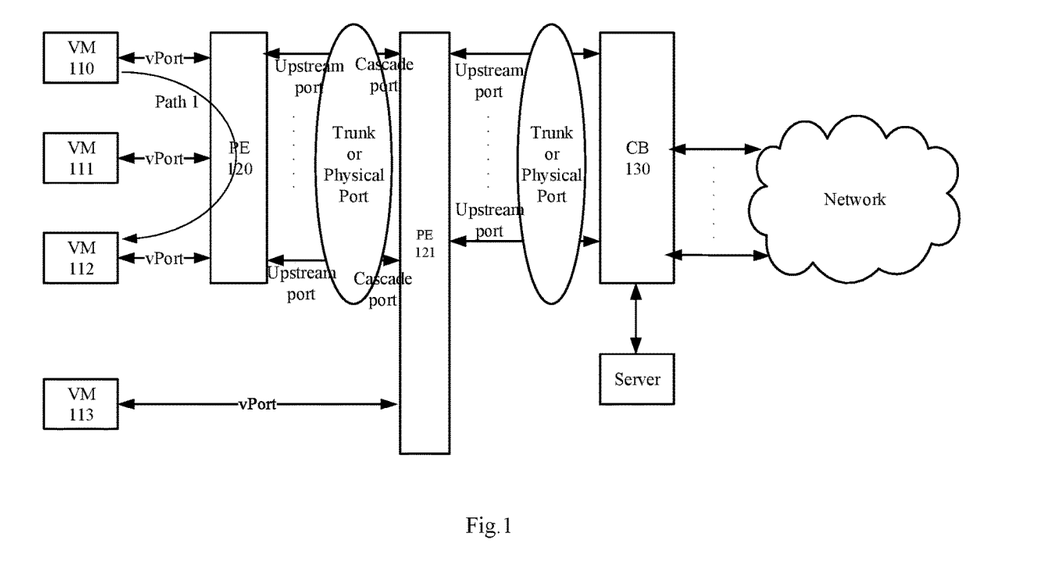
FIG. 1 illustrates a schematic diagram of a network topology according to the present disclosure.

FIG. 1 shows a network topology defined in accordance with 802.1BR.

As shown in FIG. 1, assuming that a Virtual Machine (VM) 110 wants to access a VM 112, the VM 110 may send a packet in which the destination MAC address is the MAC address of the VM 112 to a PE 120. When the PE 120 receives the packet, the PE 120 may add an E-Tag to the packet for carrying an E-tag Channel Identifier (ECID) associated to a source port (hereinafter, it may also be referred to "an ECID of the source port") and send the packet to a PE 121 through an upstream port. Accordingly, the packet may be sent by the PE 121 to a CB 130. When receiving the packet, the CB 130 may search a Media Access Control (MAC) forwarding table according to a destination MAC address of the packet, so as to determine an egress port for forwarding the packet. When the determined egress port is a service port of the CB 130, the CB 130 may remove the E-TAG of the packet and forward the packet through the determined egress port. When the determined egress port is a vPort, the CB 130 may reconstruct the E-TAG of the packet to carry a destination ECID corresponding to the vPort and send the packet to the PE 121 through a cascade port. The PE 121 may determine a cascade port according to the destination ECID carried by the E-TAG of the packet, and send the packet to the PE 120 through the determined cascade port. When receiving the packet, according to the ECID carried in the E-TAG of the packet, the PE 120 may determine that an egress port for forwarding the packet is a local port. In this case, the PE 120 may remove the E-TAG of the packet and forward it through the determined egress port. Ultimately, the VM 112 will receive the packet originally sent from the VM 110.

As may be seen from FIG. 1, when the VM 110 accesses the VM 112, even if the VM 110 and the VM 112 are connected with the same PE, the packet may not be directly forwarded by the jointly-connected PE 121 in accordance with a path 1, but is forwarded from the VM 110 to a CB through two-level PE, and then is forwarded from the CB to the VM 112 through two-level PE. Similarly, when different VMs on the same tree branch are accessed from each other, for example, the VM 110 and the VM 113 in FIG. 1 are different VMs on the same tree branch (the branch of the PE 121). Multi-level forwarding is also needed when the VM 110 and the VM 113 are accessed from each other, which increases the load of a forwarding path and lengthens a forwarding time delay. At the same time, since the cascade links between the CB and the PE and between two PEs are occupied for many times, the forwarding efficiency of the cascade links is reduced In view of this, the present disclosure provides a method of forwarding packet, which allows not to forward a packet through CB but to forward the packet in accordance with the shortest path when different VMs under the same PE are accessed from each other or VMs connecting with different PEs on the same tree branch are accessed from each other, so as to effectively shorten the forwarding path and improve the forwarding efficiency of the cascade links between the CB and the PE and between two PEs.

Figure 2:
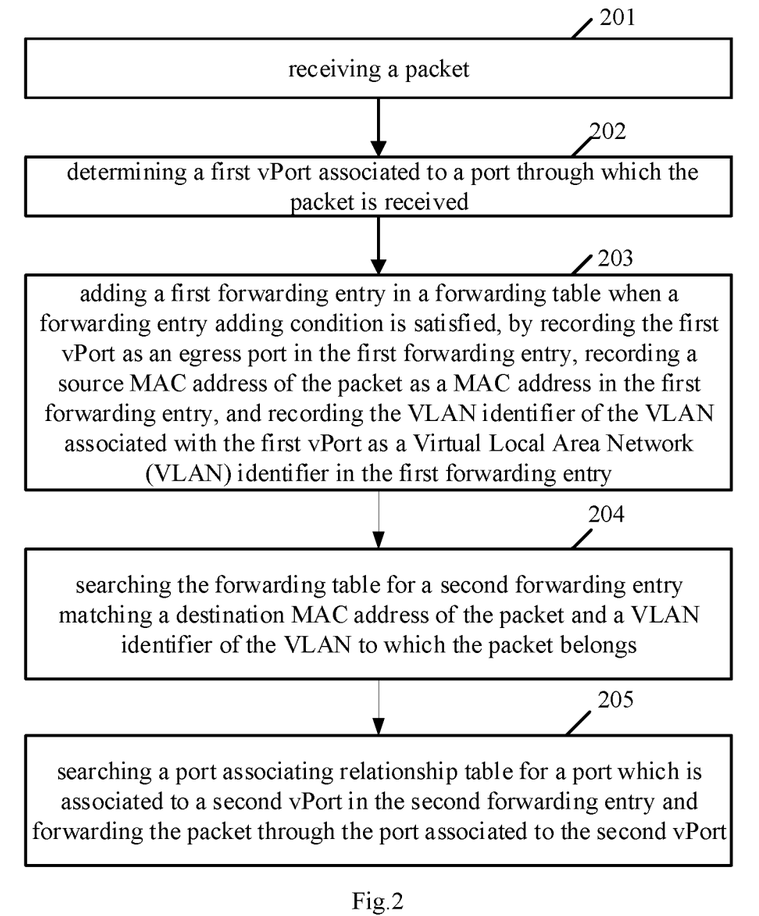
FIG. 2 schematically illustrates a flow chart of a method for forwarding packet according to an example of the present disclosure.

FIG. 2 schematically illustrates flow chart of a method for forwarding packets according to an example of the present disclosure. As shown in FIG. 2, the flow may include Blocks 201 to 204.

At block 201: a PE may receive a packet.

At block 202: The PE may determine a first vPort associated to a port through which the packet is received.

For example, at Block 202, the PE may determine the first vPort associated to the port through which the packet is received depending on a port through which the PE receives the packet.

In an example, when the PE receives the packet through a first user port, the PE may search a port associating relationship table for the vPort associated to the first user port as the first vPort.

For example, when being powered up, the PE may report its every port (including a user port and an upstream port, etc.) to the CB. The CB may associate a vPort to each port respectively reported by the PE, and may issue a port associating relationship table storing the associating relationship of port and vport to the PE. After receiving the packet from the first user port, the PE may search the port associating relationship table for the vPort corresponding to the first user port as the first vPort.

In another example, after receiving a packet from the first user port, the PE may determine a vPort which is assigned in advance to the characteristic parameter carried in the packet as the first vPort, wherein the characteristic parameter may include user information of a VM, such as the MAC address of the VM, the IP address of the VM, etc.

The user port of the PE is connected with the VM. Further, the user information of the VM may characterize the user port connecting with the VM. Therefore, the first vPort associated to the port through which the packet is received may be understood as the first vPort associated to the VM connecting with the port which the packet is received.

For example, when the PE is powered up, the PE may report the user information of the VM connecting with each user port and its every ports (including a user port and a upstream port, etc.) to the CB. The CB may associate a vPort for each port reported by PE respectively, and may issue the port associating relationship table storing the associating relationship of port and vport to the PE. In addition, the CB may assign a vPort to the VM connecting with each user port of the PE. The vPort assigned to the VM connecting with each user port is the vPort associated to each user port respectively in the port associating relationship table. The CB issues a configuration table storing associating relationship of the user information of the VM and vPort to the PE.

After receiving the packet from the first user port, the PE may identify the characteristic parameter carried in the packet, such as the source MAC address and the source IP address of the packet. The source MAC address and the source IP address are the source MAC address and the source IP address of the VM corresponding to the port through which the packet is received. The PE may search a configuration table for a vPort corresponding to the characteristic feature carried in the packet such as the source MAC address and so on as the first vPort.

In another example, when the PE receives a packet through the first cascade port, the PE may determine the vPort associated to a source ECID carried in a first tag of the packet as the first vPort.

In the initialization configuration, the CB may issue the associating relationship table of a port on the PE and a vPort and the associating relationship table of a vPort and a ECID. It may be seen that the port on the PE has a corresponding relationship with the ECID. Therefore, determining the first vPort may be understood as determining a first vPort which is associated to the ECID corresponding to the port through which the packet is received.

For example, after receiving a packet from a cascade port, the PE may obtain a ECID from a first tag of the packet, search the associating relationship table of the vPort and the ECID for a vPort corresponding to the ECID as the first vPort.

At block 203: The PE may add a first forwarding entry in a forwarding table when a forwarding entry adding condition is satisfied, by recording the first vPort as an egress port in the first forwarding entry, recording a source MAC address of the packet as a MAC address in the first forwarding entry, and recording the VLAN identifier of the VLAN associated with the first vPort as a Virtual Local Area Network (VLAN) identifier in the first forwarding entry.

wherein, the forwarding entry adding condition may be set based on the principle that the forwarding entry is not established repeatedly and the MAC address is not moved and the like. For example, the forwarding entry adding condition may include any one or more of the following conditions:

1) there is no forwarding entry in which the MAC address is the source MAC address of the packet in the forwarding table; or 2) the packet is received through a user port, and the learned forwarding entry matching the source MAC address of the packet is learned from another packet received through an upstream port.

Herein when the condition 2) is satisfied, the learned forwarding entry matching the source MAC address of the packet may be deleted. The condition 1) may ensure that the forwarding entry matching the source MAC address of the packet is not added repeatedly in the forwarding table; and the condition 2) may prevent the MAC address from moving to ensure that the forwarding entry learned from the user port takes precedence.

In an example, the process of learning a forwarding entry by a packet received through an upstream port may include: if the forwarding entry matching the destination MAC address of the packet cannot be acquired from every PE, the packet may be sent to a CB through the each PE and broadcast by the CB. During the process of broadcasting by the CB to the each PE, after the PE receives the packet broadcast by the CB from the upstream port, if there is no forwarding entry in which the MAC address is the source MAC address of the packet on the PE, the PE may learn the forwarding entry by the packet, by recording the source MAC address of the packet as the MAC address, recording the vPort associated to the upstream port as the egress port, and recording the VLAN identifier to which the packet belongs as the VLAN identifier.

At block 204: The PE may search the forwarding table for a second forwarding entry matching a destination MAC address of the packet and a VLAN identifier of the VLAN to which the packet belongs.

In an example, at block 204, searching the forwarding table for a second forwarding entry matching the destination MAC address of the packet and the VLAN identifier of a VLAN to which the packet belongs may include that: the PE may search the forwarding table for a second forwarding entry matching the destination MAC address of the packet and the VLAN identifier of the VLAN associated with the first vPort when the packet is received through a first user port.

The PE may search the forwarding table for a second forwarding entry matching the destination MAC address of the packet and the VLAN identifier of the VLAN in the second tag carried in the packet when the packet is received through a cascade port.

At block 205: The PE may search a port associating relationship table for a port which is associated to a second vPort in the second forwarding entry and may forward the packet through the port associated to the second vPort.

In an example, at Block 205, if the port associated to the second vPort is an upstream port and the packet is received through a first user port, the PE may add a first tag and a second tag into the packet, and send the packet with the first tag and the second tag through the upstream port. In another example, at Block 205, if the port associated to the second vPort is a second cascade port and the packet is received through a first user port, the PE may add a first tag and a second tag into the packet, and send the packet with the first tag and the second tag through the second cascade port. If the port associated to the second vPort is a second user port and the packet is received through a first user port, the PE may send the packet through the second user port.

At block 205, if the port associated to the second vPort is an upstream port and the packet is received through a first cascade port, the PE may send the packet through the upstream port. At block 204, if the port associated to the second vPort is a second cascade port and the packet is received through a first cascade port, the PE may send the packet through the second cascade port. If the port associated to the second vPort is a second user port and the packet is received through a first cascade port, the PE may remove the first tag and the second tag carried by the packet, and send the packet without the first tag and the second tag through the second cascade port.

In another example, at block 205, if the PE does not find the second forwarding table entry in the forwarding table and the packet is received through a first user port, the PE may add a first tag and a second tag in the packet, and send the packet through an upstream port. If the PE does not find the second forwarding table entry in the forwarding table and the packet is received through a first cascade port, the PE may send the packet through the upstream port for forwarding.

Herein the first tag may carry a source ECID, the source ECID is an ECID associated with the first vPort, and the second tag may carry an VLAN identifier of a VLAN associated with the first vPort.

As may be seen from the flow shown in FIG. 2, a PE may store a forwarding table. In this way, when a packet is received, the PE may search the forwarding table for a forwarding entry matching the destination MAC address of the packet and the VLAN identifier of a VLAN to which the packet belongs. The PE may forward the packet through the user port when the port associated to the vPort in the matching forwarding entry is a user port. The packet forwarding mechanism of that a PE blindly sends a packet to a CB through each upstream port and the packet is forwarded ultimately by the CB is no longer applied. It can be achieved by that the packet may be forwarded not through the CB but to be forwarded in accordance with the shortest path when different VMs under the same PE or VMs connecting with different PEs on the same tree branch are accessed from each other, so as to effectively shorten the forwarding path and effectively improve the forwarding efficiency of the cascade links between the CB and the PE and between the PE and the PE.

The flow shown in FIG. 2 is described below by two specific embodiments.

Figure 3:
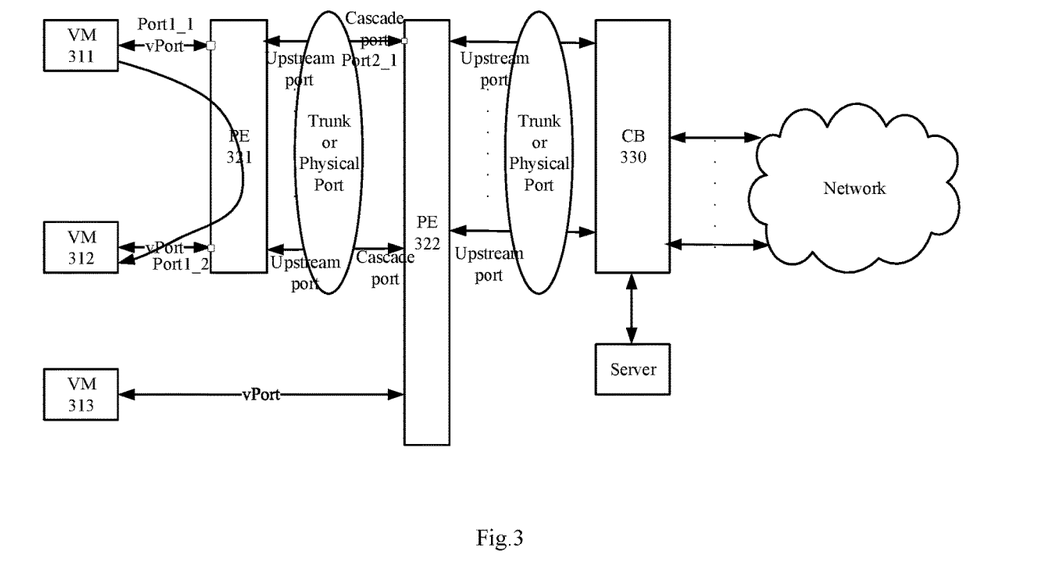
FIG. 3 schematically illustrates a network in which a method for forwarding packet may be applied according to an example of the present disclosure.

FIG. 3 schematically illustrates networking diagram in which a method of forwarding packet may be applied, according to Embodiment 1 of the present disclosure. In FIG. 3, the VM 311 and the VM 312 are connected with the same PE 321. In the Embodiment 1, taking the VM 311 accessing the VM 312 as an example, the above method of forwarding packet is described in detail.

The VM 311 may send a packet which may be denoted as packet 1. The source MAC address of the packet 1 is the MAC address of the VM 311 (denoted as MAC1) and the destination MAC address of the packet 1 is the MAC address of the VM 312 (denoted as MAC2).

The PE 321 may receive the packet 1 through a user port (denoted as Port1_1). The user port here may be a physical port or a logical port. The present disclosure is not particularly limited thereto.

The PE 321 may determine a vPort associated to the Port1_1.

That determining the vPort associated to the Port1_1 by PE 321 may be achieved by a plurality of embodiments. Two embodiments are taken as an example simply.

Embodiment 1

When being powered up, the PE may report each of its own ports (including a user port and an upstream port, etc.) to a CB. After receiving the ports reported by PE, the CB may associate an vPort for each port on the PE respectively (it also means assigning vPorts to the PE) and send a port associating relationship table to the PE. One port on the same PE may be associated to a plurality of vPorts.

Based on this, in the Embodiment 1, the PE 321 may search the port associating relationship table from the CB 330 for the vPort associated to the Port1_1. When the PE 321 acquires a plurality of vPorts associated to the Port1_1 from the port associating relationship table, one of the vPorts may be specified as the vPort associated to the Port1_1.

Embodiment 2

When being powered up, the PE may report the user information of the VM connecting with each user port and each of its own ports (including a user port and an upstream port, etc.) to a CB. The CB may associate a vPort for each port reported by the PE, and may issue to the PE the port associating relationship table storing a port and a vPort. In addition, the CB may assign a vPort to the VM connecting with each user port of the PE. A vPort assigned to the VM connecting with each user port is a vPort associated to each user port respectively in the port associating relationship table. The CB may issue a configuration table storing user information of the VM and a vPort associating relationship to the PE.

Based on this, in the Embodiment 2, after receiving a packet from the Port1_1, the PE 321 may identify a characteristic parameter carried in the packet. The characteristic parameter may include the user information of the VM, such as the source MAC address and the source IP address of the packet, etc. The PE 321 may search the configuration table for the vPort corresponding to the characteristic parameter as the vPort associated to the Port1_1.

For ease of description, the vPort associated to the Port1_1 through which the packet 1 is received is denoted as vPort1_1 herein.

In the Embodiment 1 or Embodiment 2, after finishing assigning the vPort to each port of the PE, the CB may associate an ECID for each vPort. Herein the ECID associated to each vPort on the same PE is unique, while the same ECID may be associated to different vPorts on different PEs. For example, the ECID of the vPort1_1 on the PE 321 is ECID1, and the ECID of the vPort2_1 on the PE 322 is ECID1.

When a forwarding entry adding condition is satisfied, the PE 321 may add a forwarding entry (denoted as entry 1) learned by the packet 1 received through the VM 311 in a forwarding table. Here, The entry 1 may include the vPort1_1 as an egress port, the source MAC address MAC1 of the packet 1 as a MAC address and the identifier of the VLAN (denoted as VLAN1) associated with the vPort1_1 as a VLAN identifier. Table 1 shows the structure of the entry 1. Herein the port associated to the vPort1_1 may be the user port of the PE 321, e.g. Port1_1.

TABLE 1

| MAC address | Egress port | VLAN |
|---|---|---|
| MAC1 | vPort1_1 | VLAN1 |

The PE 321 may search the forwarding table for the forwarding entry (denoted as entry 2) matching the destination MAC address MAC2 of the packet 1 and the VLAN identifier of the VLAN1. Herein the entry 2 may be preconfigured on the PE 321 or the entry 2 may be added to the forwarding table of the PE 321 by the same way the entry 1 is learned. The egress port of the entry 2 is vPort1_2. Table 2 shows the entry 2. The case where the entry 2 is not acquired will be described hereinafter.

TABLE 2

| MAC address | Egress port | VLAN |
|---|---|---|
| MAC2 | vPort1_2 | VLAN1 |

The PE 321 may search the port associating relationship table for the port associated to the vPort1_2.

If the PE 321 finds that the port associated to the vPort1_2 is a user port (denoted as Port1_2) connecting with the VM 312, the PE 321 may send the packet 1 through the user port Port1_2. Ultimately, the packet 1 will arrive at the VM 312. This allows the PE 321 to forward the packet from VM 311 to the VM 312 in a shortest path.

When the PE 321 does not acquire the forwarding entry in the forwarding table (e.g., there is no entry 2 in the forwarding table), or when the PE 321 finds that the port associated to vPort1_2 used as the egress port in the forwarding entry is an upstream port, the PE 321 may add a first tag and a second tag to the packet 1. The packet 1 added with the first tag and the second tag is referred to as packet 2 herein.

The first tag is an outer tag compared with the second tag, and the second tag is an inner tag. The first tag may carry a source ECID which is the ECID (denoted ECID1) associated with the vPort1_1. The second tag may carry the VLAN identifier of the VLAN1. For example, the first tag may be E-Tag, and the second tag may be C-Tag.

The PE 321 may then send the packet 2 through the upstream port.

When receiving the packet 2 through the cascade port connecting with the PE 321, the PE 322 may search the associating relationship table storing a ECID and a vPort relationship for the vPort (denoted as vPort2_1) corresponding to the source ECID in the first tag carried in the packet 2.

The PE 322 may search the forwarding table for the forwarding entry matching the destination MAC address MAC2 of the packet 2 and the VLAN identifier of the VLAN1 carried in the second tag of the packet 2.

If the PE 322 finds that there is no matching forwarding entry in the forwarding table, the packet 2 may be sent to the upper PE or the CB through the upstream port.

When the forwarding entry adding condition is satisfied, the PE 322 may add a forwarding entry (denoted as entry 3) learned by the packet 2 received through the PE 321 in the forwarding table. Here, the egress port of the entry 3 is vPort2_1 associated with the source ECID carried in the first tag of the packet 2 on the PE 322. The port associated to the vPort2_1 may be the cascade port through which the PE 322 receives the packet 2. The entry 3 may also include the source MAC address MAC1 of the packet 2 and the VLAN identifier of the VLAN1 (which is in fact also the VLAN associated with the vPort2_1) carried in the second tag of the packet 2. When there is no vPort2_1 on the PE 322, the packet 2 may be directly discarded and the current flow is ended. Table 3 shows the structure of the entry 3.

TABLE 3

| MAC address | Egress port | VLAN |
|---|---|---|
| MAC1 | vPort2_1 | VLAN1 |

When receiving the packet 2, the CB 330 may search the forwarding table for the forwarding entry matching the VLAN identifier of VLAN1 carried in the second tag and the destination MAC address MAC2 of the packet 2. If there is no matching forwarding entry in the forwarding table, the packet 2 may be broadcast in the VLAN1 according to the VLAN identifier of VLAN1 in the second tag of the packet 3. If there is a matching forwarding entry in the forwarding table, the packet 2 may be forwarded according to the matching forwarding entry (the forwarding process is similar to the prior art, which will not be described here).

Here the bridge CB 330 may broadcast the packet 2 in the VLAN1, which will be described as an example.

When the PE 322 receives the packet 2 broadcast by the CB 330, in order to prevent the MAC address from moving, the PE 322 will no longer learn the entry in which the MAC address is MAC1 by the packet 2 broadcast by the CB 330 when the above entry 3 is learned by the packet 2 from the PE 321 has not been aged yet.

However, when there is no forwarding entry in which the MAC address is MAC1 in the PE 322, the PE 322 may learn the forwarding entry from the packet 2 broadcasted by the CB 330. At this time, the MAC address in the learned forwarding entry is the source MAC address of the packet 2, the egress port is the vPort associated to the upstream port through which the packet 2 broadcasted by the CB 330 is received, and the VLAN identifier is the identifier of the VLAN to which the packet 2 belongs.

The packet forwarding mechanism of PE 321 is similar to that of the PE 322. Ultimately, the PE 321 will remove the first tag and the second tag carried in the packet 2. The packet 2 in which the first tag and the second tag are removed is denoted as a packet 3, and the PE 321 may send the packet 3 to the VM 312.

When receiving the packet 3, if the VM 312 finds that the destination MAC address MAC2 of the packet 3 is its own MAC address, the VM 312 may return a response packet. The response packet is denoted as a packet 4 here. The source MAC address of the packet 4 is MAC2 and its destination MAC address is MAC1.

The PE 321 may receive the packet 4 through an user port (denoted as Port1_2).

The PE 321 may search the port associating relationship table from the CB 330 for the vPort associated to the user port Port1_2 as the vPort associated to the Port1_2 through which the packet 4 is received. As an embodiment of the present disclosure, the PE 321 may also determine a vPort which is assigned in advance to the user information carried in the packet 4 as the vPort associated to the Port1_2. Here, the user information carried in the packet 4 may include the source MAC address MAC2 of the packet 4. For ease of description, the vPort associated to the Port1_2 is denoted as vPort1_2 herein.

When forwarding entry adding condition is satisfied, the PE 321 may add a forwarding entry learned by the packet 4 received through the VM 312 (denoted as entry 4) in the forwarding table. Here, the entry 4 may include the vPort1_2 as an egress port, the source MAC address MAC2 of the packet 4 as a MAC address and the identifier of the VLAN associated with the vPort1_2 (denoted as VLAN11 as a VLAN identifier Table 4 shows the structure of the entry 4

TABLE 4

| MAC address | Egress port | VLAN |
| --- | --- | --- |
| MAC2 | vPort1_2 | VLAN1 |

The PE 321 may search the forwarding table for a forwarding entry matching the destination MAC address MAC1 of the packet 4 and the VLAN identifier of the VLAN1. The forwarding entry acquired here is the above entry 1.

When acquiring the entry 1, the PE 321 may identify the egress port of the entry 1 as vPort1_1.

The PE 321 may search the port associating relationship table for the port associated to the vPort1_1. The PE 321 finds that the port associated to the vPort1_1 is the user port Port1_1 connecting with the VM 311. The PE 321 may send the packet 4 through the user port Port1_1. Ultimately, the packet 4 will arrive at the VM 311. This allows the PE 321 to forward the response packet from the VM 312 to the VM 311 in the shortest path.

Thus, the description of Embodiment 1 is completed.

Figure 4:
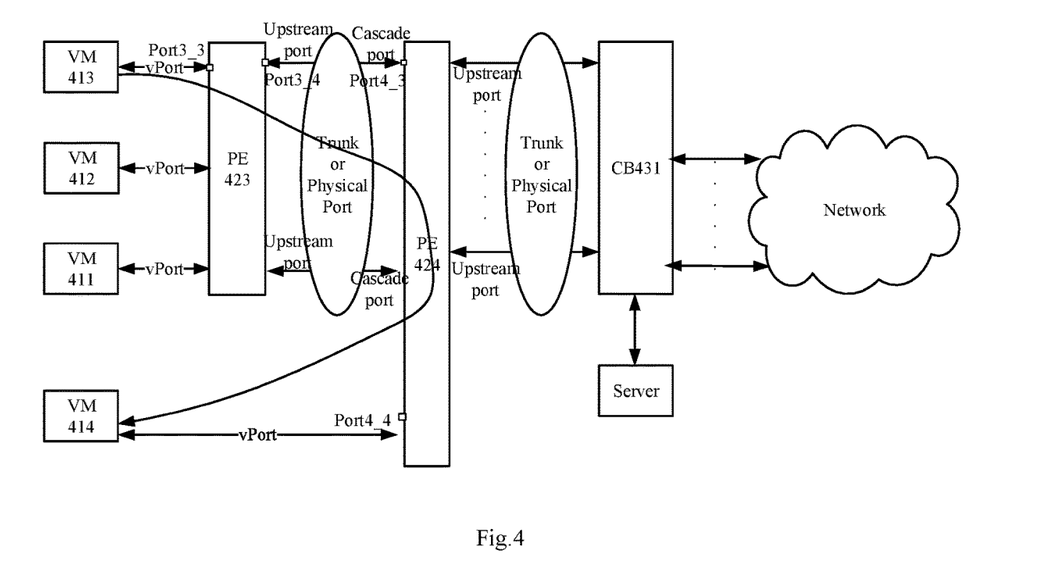
FIG. 4 schematically illustrates a network in which a method for forwarding packet may be applied according to another example of the present disclosure.

FIG. 4 schematically illustrates network in which a method of forwarding packet may be applied, according to Embodiment 2 of the present disclosure. In FIG. 4, the VM 413 is connected with the VM 414 through the PE 423, and the VM 414 is connected with the PE 424 directly.

In this embodiment, taking the VM 413 accessing the VM 414 as an example, the above method of forwarding packet is described in detail.

The VM 413 may send a packet. Herein the packet is denoted as packet 3_1. The source MAC address of the packet 3_1 is the MAC address of the VM 413 (denoted as MAC3) and the destination MAC address of the packet 3_1 is the MAC address of the VM 414 (denoted as MAC4).

The PE 423 may receive the packet 3_1 through a user port (denoted as Port3_3).

The PE 423 may search the port associating relationship table from the CB 431 for the vPort associated to the user port Port3_3. As an embodiment of the present disclosure, the PE 423 may also determine a vPort which is assigned in advance to the user information carried in the packet 3_1 as the vPort associated to the Port3_3. Here, the user information carried in the packet 3_1 may include the source MAC address MAC3 of the packet 3_1. For ease of description, the vPort associated to the Port3_3 is denoted as vPort3_3 herein.

When the forwarding entry adding condition is satisfied, the PE 423 may add a forwarding entry learned by the packet 3_1 received through the VM 413 to the forwarding table, e.g., the forwarding entry in which the MAC address is the source MAC address MAC3 of the packet 3_1 (denoted as entry 3_1). Here, the entry 3_1 may include the vPort3_3 as a egress port, source MAC address MAC3 of the packet 3_1 as a MAC address and the VLAN identifier of the VLAN (denoted as VLAN3_3) associated with the vPort3_3 as a VLAN identifier. Table 5 shows the structure of the entry 3_1.

TABLE 5

| MAC address | Egress port | VLAN |
| --- | --- | --- |
| MAC3 | vPort3_3 | VLAN3_3 |

The PE 423 may search the forwarding table for the forwarding entry (denoted as entry 3_2) matching the destination MAC address MAC4 of the packet 3_1 and the VLAN identifier of the VLAN3_3. The egress port of the entry 3_2 is vPort3_4. The case where the entry 3_2 is not acquired will be described hereinafter.

The PE 423 may search the port associating relationship table for the port associated to the vPort3_4. When the PE 423 finds that the port associated to vPort3_4 is an upstream port, the PE 423 may add a first tag and a second tag to the packet 3_1. The packet 3_1 added with the first tag and the second tag is referred to as packet 3_2 herein. Herein the first tag is an outer tag compared with the second tag, and the second tag is an inner tag. The first tag may carry a source ECID which is the ECID (denoted ECID3_3) associated with the vPort3_3 on the PE 423. The second tag may carry the VLAN identifier of the VLAN3_3. For example, the first tag may be E-Tag, and the second tag may be C-Tag.

When the PE 423 does not acquire the entry 3_2 in the forwarding table, the principle of packet forwarding is similar to that in the above case that the port associated to vPort3_4 is an upstream port. For example, the PE 423 may send the packet 3_2 through the upstream port.

The PE 424 may receive the packet 3_2 through the cascade port connecting with the PE 423. The PE 424 may search the associating relationship table storing a ECID and a vPort relationship of PE 424 for the vPort (denoted as vPort4_3) corresponding to the source ECID carried in the packet 3_2.

When the forwarding entry adding condition is satisfied, the PE 424 may add a forwarding entry learned by the packet 3_2 received through the PE 423 (denoted as entry 3_3) in the forwarding table. Herein, the egress port of the entry 3_3 is the vPort4_3 associated with the source ECID carried in the first tag of the packet 3_2 on the PE 424. The port associated to the vPort4_3 may be the cascade port through which the PE 424 receives the packet 3_2. The vPort4_3 on the PE 424 is associated with the same ECID as the vPort3_3 on the PE 423, e.g., the source ECID carried in the first tag of the packet 3_2. The entry 3_3 may also include the source MAC address MAC3 of the packet 3_2 and the VLAN identifier of the VLAN3_3 (which is in fact also the VLAN associated with the vPort4_3) carried in the second tag. Table 6 shows the structure of the entry 3_3.

TABLE 6

| MAC address | Egress port | VLAN |
| --- | --- | --- |
| MAC3 | vPort4_3 | VLAN3_3 |

The PE 424 may search the forwarding table for a forwarding entry in matching the source MAC address MAC4 of the packet 3_2 and the VLAN identifier of the VLAN3_3 carried in the second tag of the packet 3_2.

If the PE 424 finds that there is a matching forwarding entry in the forwarding table (denoted as entry 3_4) and identifies that the egress port of the entry 3_4 is vPort4_4, the PE 424 may search the port associating relationship table for the port associated to the vPort4_4.

If the PE 424 finds that the port associated to the vPort4_4 is a user port (denoted as Port4_4) connecting with the VM 414, the first tag and the second tag carried in the packet 3_2 may be removed. The packet 3_2 in which the first tag and the second tag are removed is denoted as packet 3_3 here. The PE 424 may send the packet 3_3 through the user port Port4_4. Ultimately, the packet 3_3 will arrive at the VM 414. This allows the PE 424 to forward the packet from the VM 413 to the VM 414 in the shortest path rather than forward the packet through the CB when VMs connecting with different PEs on the same tree branch are accessed from each other In Embodiment 2, if the PE 424 does not acquire a matching forwarding entry in the forwarding table, or when the PE 424 finds that the port associated to the vPort4_4 is an upstream port, the PE 424 may send the packet 3_2 through the upstream port.

When receiving the packet 3_2, the CB 431 may search the forwarding table for the forwarding entry matching the VLAN identifier of VLAN3_3 carried in the second tag and the destination MAC address MAC4 of the packet 3_2. If there is no matching forwarding entry in the forwarding table, the packet 3_2 may be broadcast in the VLAN3_3 according to the VLAN identifier of VLAN3_3 in the second tag of the packet 3_2. If there is a matching forwarding entry in the forwarding table, the packet 3_2 may be forwarded according to the matching forwarding entry. The forwarding process is similar to a solution know for a skilled in the art, which will not be described here.

Here the bridge CB 431 may broadcast the packet 3_2 in the VLAN3_3, which will be described as an example.

When receiving the packet 3_2 broadcast by the CB 431, in order to prevent the MAC address from moving, the PE 424 will no longer learn the entry in which the MAC address is the MAC address MAC3 by the packet 3_2 broadcast by the CB 431 when the above entry 3_3 learned by the packet 3_2 from the PE 423 has not been aged yet. The packet forwarding mechanism of PE 423 is similar to that of the PE 424. Ultimately, the PE 424 may remove the first tag and the second tag carried in the packet 3_2 broadcast by the CB 431 (e.g., the above packet 3_3 is obtained), and then send the packet 3_3 to the VM 414.

However, when there is no forwarding entry in which the MAC address is MAC3 in the PE 424, the PE 424 may learn the forwarding entry from the packet 3_2 broadcasted by the CB 431. At this time, the MAC address of the learned forwarding entry is the source MAC address of the packet 3_2, the egress port is the vPort associated to the upstream port through which the packet 3_2 broadcasted by the CB 431, and the VLAN identifier is the identifier of the VLAN to which the packet 3_2 belongs.

If the VM 414 finds that the destination MAC address MAC4 of the packet 3_3 is its own MAC address when receiving the packet 3_3, the VM 414 will return a response packet. The response packet is denoted as a packet 3_4 here. The source MAC address of the packet 3_4 is MAC4 and the destination MAC address of the packet 3_4 is MAC3.

The PE 424 may receive the packet 3_4 through the user port (denoted as Port4_4).

The PE 424 may search the port associating relationship table from the CB 431 for the vPort associated to the user port Port4_4. As an embodiment of the present disclosure, the PE 424 may also determine a vPort which is assigned in advance to the characteristic parameter carried in the packet 3_4 as the vPort associated to the Port4_4. Here, the characteristic parameter carried in the packet 3_4 may include the source MAC address MAC4 of the packet 3_4. For ease of description, the vPort associated with the packet 3_4 is denoted as vPort4_4 herein.

When the forwarding entry adding condition is satisfied, the PE 424 may add a forwarding entry learned by the packet 3_4 received through the user port (denoted as entry 3_5) in the forwarding table. Here, the egress port of the entry 3_5 is the vPort4_4. The entry 3_5 may also include the source MAC address MAC4 of the packet 3_4 and the VLAN identifier of the VLAN associated with the vPort4_4 (i.e., the above VLAN3_3). Table 7 shows the entry 3_5.

TABLE 7

| MAC address | Egress port | VLAN |
|---|---|---|
| MAC4 | vPort4_4 | VLAN3_3 |

The PE 424 may search the forwarding table for a forwarding entry matching the destination MAC address MAC3 of the packet 3_4 and the VLAN identifier of the VLAN3_3. The forwarding entry acquired here is the above entry 3_3.

When acquiring the matching forwarding entry, e.g., the entry 3_3, the PE 424 may identify that the egress port of the entry 3_3 is the vPort4_3. The PE 424 may search the port associating relationship table for the port associated to the vPort4_3. If the PE 424 finds that the port associated to the vPort4_3 is a cascade port, the PE 424 may add a first tag and a second tag to the packet 3_4. The packet 3_4 added with the first tag and the second tag is referred to as the packet 3_5. Herein the source ECID carried in the first tag is the ECID associated with the vPort4_4, and the second tag may carry the VLAN identifier of the VLAN3_3 (in fact, the VLAN associated with the vPort4_4).

The PE 423 may receive the packet 3_5 through the upstream port.

When the forwarding entry adding condition is satisfied, the PE 423 may add a forwarding entry learned by the packet 3_5 received through the PE 424 (denoted as entry 3_6) in the forwarding table. Here, the egress port of the entry 3_6 is the vPort (denoted as vPort3_4) associated to the upstream port through which the PE 423 receives the packet 3_5. The entry 3_6 may also include the source MAC address MAC4 of the packet 3_5 and the VLAN identifier of the VLAN3_3 (in fact, the VLAN associated with the vPort3_4) carried in the second tag of the packet 3_5. Table 8 shows the entry 3_6.

TABLE 8

| MAC address | Egress port | VLAN |
|---|---|---|
| MAC4 | vPort3_4 | VLAN3_3 |

The PE 423 may search the forwarding table for a forwarding entry matching the destination MAC address MAC3 and the VLAN identifier of the VLAN3_3 carried in the second tag of the packet 3_5. The forwarding entry acquired here is the entry 3_1.

The PE 423 may identify that the egress port of the entry 3_1 is the vPort3_3. The PE 423 may search the port associating relationship table for the port associated to the vPort3_3. If the PE 423 finds that the port associated to the vPort3_3 is the user port (denoted as Port3_3) connecting with the VM 413, the first tag and the second tag of the packet 3_5 may be removed. The packet 3_5 in which the first tag and the second tag are removed is referred to as packet 3_6 herein.

The PE 423 may send the packet 3_6 through the user port Port3_3. Ultimately, the packet 3_6 will arrive at the VM 413. This allows not to forward the packet through the CB when VMs connecting with different PEs on the same tree branch are accessed from each other.

Thus, the description of Embodiment 2 is completed.

For the device embodiment, since it corresponds substantially to the method embodiment, reference is made to the partial description of the method embodiment for the related part. The device embodiment described above is merely illustrative, wherein the unit described as a separating component may or may not be physically separate, and the component shown as a unit may or may not be a physical unit, which may be located in one place or may be distributed to a plurality of network units. A part or all of the modules may be selected according to the actual needs to achieve the object of the solution of the present disclosure. One of ordinary skill in the art will understand and practice without paying creative work.

The method of forwarding packet provided in the present disclosure has been described above. A device for forwarding packet provided in the present disclosure will be described below.

Figure 5:
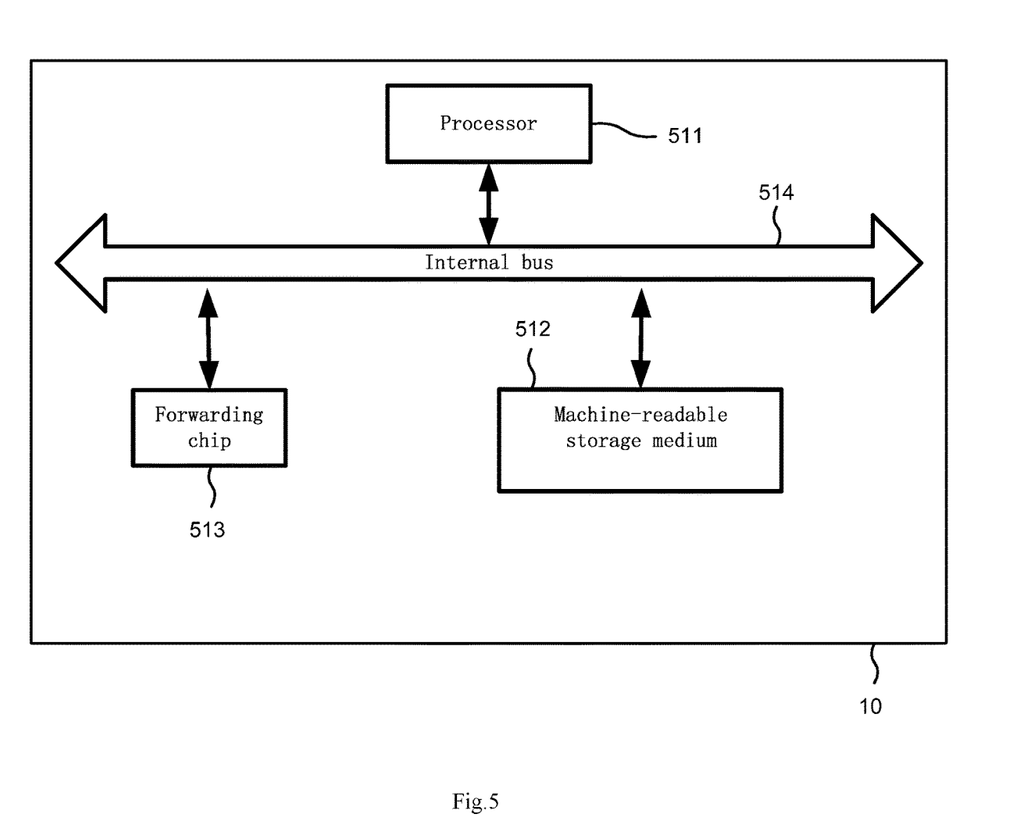
FIG. 5 is a hardware structural diagram of a PE according to an example of the present disclosure.

FIG. 5 is a hardware structural diagram of a PE according to the present disclosure. In addition to a processor 511, a machine-readable storage medium 512, a forwarding chip 513, and an internal bus 514 shown in FIG. 5, the PE device may also include other hardware according to the actual function of the PE device, which will not be described herein.

In a different embodiment, the machine-readable storage medium 512 may be a Radom Access Memory (RAM), a volatile memory, a non-volatile memory, a flash memory, a storage drive (such as a hard disk drive), a solid state drive, any type of storage disk (for example, optical disk, DVD, etc.), or a similar storage medium, or a combination thereof.

Further, the above forwarding chip 513 may receive a packet; the forwarding chip 513 may determine a first vPort associated to the port through which the packet is received.

The above forwarding chip 513 may send the packet to the processor 511, and the processor 511 may invoke a machine-readable instruction for a logic of adding an entry saved in the above machine-readable storage medium 512 when a forwarding entry adding condition is satisfied. The logic of adding an entry may be as follows: adding a first forwarding entry in a forwarding table, by recording the first vPort as an egress port in the first forwarding entry, recording a source MAC address of the packet as a MAC address in the first forwarding entry, and recording the VLAN identifier of the VLAN associated with the first vPort as a VLAN identifier in the first forwarding entry.

For example, after determining the first vPort, the above forwarding chip 513 may add a first tag into the packet and the first tag may carry the ECID associated to the first vPort. The above forwarding chip 513 may send the packet added with the first tag to the processor 511, and the processor 511 may determine the first vPort associated with the ECID carried in the packet. When the forwarding entry adding condition is satisfied, a forwarding entry for the packet may be added, by recording a source MAC address of the packet as a MAC address in the forwarding entry, recording the first vPort as a egress port in the forwarding entry, and recording the VLAN identifier of the VLAN associated with the first vPort as a VLAN identifier.

The above forwarding chip 513 may search the forwarding table for a second forwarding entry matching the destination MAC address of the packet and the VLAN identifier of the VLAN to which the packet belongs.

The above forwarding chip 513 may search a port associating relationship table for a port associated to a second vPort in the second forwarding entry, and the above forwarding chip 513 may forward the packet through the port associated to the second vPort.

According to an example, the above forwarding chip 513 may determine the first vPort associated to the port through which the packet is received, including that: the forwarding chip 513 may search the port associating relationship table for a vPort which is associated to a first user port when the packet is received through the first user port; the forwarding chip 513 may determine the a vPort which is assigned in advance to a characteristic parameter carried in the packet as the first vPort when the packet is received through a first user port; the forwarding chip 513 may determine the vPort which is associated to a source ECID carried in the first tag of the packet as the first vPort when the packet is received through a first cascade port.

According to another example, the above forwarding chip 513 may forward the packet through the port associated to the second vPort, including that: the forwarding chip 513 may send the packet which is generated by adding a first tag and a second tag to the packet through an upstream port when the port associated to the second vPort is the upstream port and the packet is received through a first user port; the forwarding chip 513 may send the packet which is generated by adding a first tag and a second tag to the packet through a second cascade port when the port associated to the second vPort is the second cascade port and the packet is received through a first user port; the forwarding chip 513 may send the packet through a second user port when the port associated to the second vPort is the second user port and the packet is received through a first user port; the forwarding chip 513 may send the packet through an upstream port when the port associated to the second vPort is the upstream port and the packet is received through a first cascade port; the forwarding chip 513 may send the packet through a second cascade port when the port associated to the second vPort is the second cascade port and the packet is received through a first cascade port; the forwarding chip 513 may send the packet which is generated by removing the first tag and the second tag through a second user port when the port associated to the second vPort is the second user port and the packet is received through a first cascade port; wherein the first tag may carry a source ECID, the source ECID is an ECID associated with the first vPort, and the second tag may carry an VLAN identifier of the VLAN associated with the first vPort.

According to another example, the forwarding chip 513 may send the packet which is generated by adding a first tag and a second tag to the packet through an upstream port when the second forwarding entry is not acquired from the forwarding table and the packet is received through a first user port; the forwarding chip 513 may send the packet through an upstream port when the second forwarding entry is not acquired in the forwarding table and the packet is received through a first cascade port; wherein the first tag may carry a source ECID, the source ECID is an ECID associated with the first vPort, and the second tag may carry an VLAN identifier of the VLAN associated with the first vPort.

According to another example, the above forwarding chip 513 may search the forwarding table for a second forwarding entry matching the destination MAC address of the packet and a VLAN identifier of a VLAN to which the packet belongs, including that: the above forwarding chip 513 may search the forwarding table for a second forwarding entry matching the destination MAC address of the packet and the VLAN identifier of the VLAN associated with the first vPort when the packet is received through a first user port; the above forwarding chip 513 may search the forwarding table for a second forwarding entry matching the destination MAC address of the packet and the VLAN identifier in a second tag carried in the packet when the packet is received through a cascade port, wherein the second tag may carry the VLAN identifier of the VLAN associated with the first vPort.

According to another example, the forwarding entry adding condition may include any one or more of the followings: there is no forwarding entry in which the MAC address is the source MAC address of the packet in the forwarding table; or the packet is received through a user port, and the forwarding entry in which the MAC address is the source MAC address of the packet in the forwarding table is learned from another packet received through the upstream port.

For the device embodiment, since it corresponds substantially to the method embodiment, reference is made to the partial description of the method embodiment for the related part. The device embodiment described above is merely illustrative, wherein the unit described as a separating component may or may not be physically separate, and the component shown as a unit may or may not be a physical unit, which may be located in one place or may be distributed to a plurality of network units. A part or all of the modules may be selected according to the actual needs to achieve the object of the solution of the present disclosure. One of ordinary skill in the art will understand and practice without paying creative work.

It is to be noted that, in this context, relational terms such as a first and a second are used only to distinguish an entity or an operation from another entity or operation without necessarily requiring or implying that there is any such actual relationship or sequence between these entities or operations. The terms such as "including", "containing", or any other variants thereof are intended to encompass a non-exclusive inclusion such that a process, a method, an article or a device including a series of elements includes not only those elements, but also includes other elements that are not listed clearly or the elements that are inherent to this process, method, article, or device. In the absence of more restrictions, the elements defined by the statement "including a . . . " do not preclude the presence of the additional same elements in the process, method, article, or device that includes the elements.

The method and device provided in the embodiments of the present disclosure have been described in detail. The principles and embodiments of the present disclosure have been described with reference to specific examples herein. The description of the above embodiments is merely for helping understand the method of the present disclosure and its core idea. Meanwhile, those skilled in the art may change the specific embodiments and the scope of application according to the idea of the present disclosure. In summary, the content of the present specification should not be construed as limiting the present disclosure.

The invention claimed is:

1. A method of forwarding a packet, comprising:
receiving, by a Port Extender (PE), the packet;
determining, by the PE, a first Virtual Port (vPort) associated to a receiving port through which the packet is received;
adding, by the PE, a first forwarding entry in a forwarding table in response to a forwarding entry adding condition being satisfied, by recording the first vPort as an egress port in the first forwarding entry, recording a source Media Access Control (MAC) address of the packet as a MAC address in the first forwarding entry, and recording a Virtual Local Area Network (VLAN) identifier of a VLAN associated with the first vPort as a VLAN identifier in the first forwarding entry;
searching, by the PE, the forwarding table for a second forwarding entry matching a destination MAC address of the packet and the VLAN identifier of the VLAN to which the packet belongs; and
searching, by the PE, a port associating relationship table for a port which is associated to a second vPort in the second forwarding entry; and
forwarding, by the PE, the packet through the port associated to the second vPort.

2. The method according to claim 1, wherein determining the first vPort comprises:
searching, by the PE, the port associating relationship table to determine the first vPort being associated to a first user port in response to the receiving port being the first user port; or
determining, by the PE, the first vPort which is assigned in advance to a characteristic parameter carried in the packet in response to the receiving port being the first user port; or
determining, by the PE, the first vPort which is associated to a source E-tag Channel Identifier (ECID) carried in a first tag of the packet in response to the receiving port being a first cascade port.

3. The method according to claim 1, wherein forwarding the packet through the port associated to the second vPort comprises:
sending, by the PE, the packet being added with a first tag and a second tag through an upstream port in response to the upstream port being associated to the second vPort and a first user port being determined as the receiving port; or
sending, by the PE, the packet being added with the first tag and the second tag through a second cascade port in response to the second cascade port being associated to the second vPort and the first user port being determined as the receiving port; or
sending, by the PE, the packet through a second user port in response to the second user port being associated to the second vPort and the first user port being determined as the receiving port; or sending, by the PE, the packet through the upstream port in response to the upstream port being associated to the second vPort a first cascade port being determined as the receiving port; or
sending, by the PE, the packet through the second cascade port in response to the second vPort being associated with the second cascade port and the first cascade port being determined as the receiving port; or
sending, by the PE, the packet being removed from the first tag and the second tag through the second user port in response to the second vPort being associated to the second user port and the first cascade port being determined as the receiving port;

wherein the first tag carries a source ECID associated with the first vPort, and the second tag carries the VLAN identifier associated with the first vPort.

4. The method according to claim 1, further comprising:
sending, by the PE, the packet being added with a first tag and a second tag through an upstream port in response to that the second forwarding entry is not acquired from the forwarding table and the receiving port is a first user port; or sending, by the PE, the packet through the upstream port in response to that the second forwarding entry is not acquired from the forwarding table and the receiving port is a first cascade port;

wherein the first tag carries a source ECID associated with the first vPort, and the second tag carries the VLAN identifier associated with the first vPort.

5. The method according to claim 1, wherein searching the forwarding table for the second forwarding entry matching the destination MAC address of the packet and the VLAN identifier of the VLAN to which the packet belongs comprises:

searching, by the PE, the forwarding table for a second forwarding entry matching the destination MAC address of the packet and the VLAN identifier associated with the first vPort in response to the receiving port being a first user port; or searching, by the PE, the forwarding table for a second forwarding entry matching the destination MAC address of the packet and the VLAN identifier in a second tag carried by the packet in response to the receiving port being a cascade port, wherein the second tag carries the VLAN identifier associated with the first vPort.

6. The method according to claim 1, wherein the forwarding entry adding condition comprises any one or more of the following:

there is no forwarding entry in which the MAC address is the source MAC address of the packet in the forwarding table; or the receiving port is a user port, and the forwarding entry in which the MAC address is the source MAC address of the packet in the forwarding table is learned from a packet received through an upstream port.

7. A Port Extender (PE), comprising a processor and a forwarding chip, wherein receiving, by the forwarding chip, a packet;

determining, by the forwarding chip, a first Virtual Port (vPort) associated to a receiving port through which the packet is received;

sending, by the forwarding chip, the packet to the processor;

adding, by the processor, a first forwarding entry in a forwarding table in response to a forwarding entry adding condition being satisfied, by recording the first vPort as an egress port in the first forwarding entry, recording a source MAC address of the packet as a Media Access Control (MAC) address in the first forwarding entry, and recording a Virtual Local Area Network (VLAN) identifier of a VLAN associated with the first vPort as a VLAN identifier in the first forwarding entry;

searching, by the forwarding chip, the forwarding table for a second forwarding entry matching a destination MAC address of the packet and the VLAN identifier of a VLAN to which the packet belongs;

searching, by the forwarding chip, a port associating relationship table for a port associated to a second vPort in the second forwarding entry; and forwarding, by the forwarding chip, the packet through the port associated to the second vPort.

8. The PE according to claim 7, wherein the forwarding chip determining the first vPort comprises:

searching, by the forwarding chip, the port associating relationship table to determine the first vPort being associated to a first user port in response to the receiving port being the first user port; or determining, by the forwarding chip, the first vPort which is assigned in advance to a characteristic parameter carried in the packet in response to the receiving port being the first user port; or determining, by the forwarding chip, the first vPort which is associated to a source E-tag Channel Identifier (ECID) carried in a first tag of the packet in response to the receiving port being a first cascade port.

9. The PE according to claim 7, wherein forwarding, by the forwarding chip, the packet through the port associated to the second vPort comprises any one of the following:

sending, by the forwarding chip, the packet being added with a first tag and a second tag through an upstream port in response to the upstream port being associated to the second vPort and a first user port being determined as the receiving port; or sending, by the forwarding chip, the packet being added with the first tag and the second tag through a second cascade port in response to the second cascade port being associated to the second vPort and the first user port being determined as the receiving port; or sending, by the forwarding chip, the packet through a second user port in response to the second user port being associated to the second vPort and the first user port being determined as the receiving port; or sending, by the forwarding chip, the packet through the upstream port in response to the upstream port being associated to the second vPort and a first cascade port being determined as the receiving port; or sending, by the forwarding chip, the packet through the second cascade port in response to the second vPort being associated with the second cascade port and the first cascade port being determined as the receiving port; or sending, by the forwarding chip, the packet being removed from the first tag and the second tag through the second user port in response to the second vPort associated to the second user port and the first cascade port being determined as the receiving port;

wherein the first tag carries a source ECID associated with the first vPort, and the second tag carries the VLAN identifier associated with the first vPort.

10. The PE according to claim 7, wherein
sending, by the forwarding chip, the packet being added with a first tag and a second tag through an upstream port in response to that the second forwarding entry is not acquired from the forwarding table and the receiving port is a first user port; or sending, by the forwarding chip, the packet through the upstream port in response to that the second forwarding entry is not acquired from the forwarding table and the receiving port is a first cascade port;

wherein the first tag carries a source ECID associated with the first vPort, and the second tag carries the VLAN identifier associated with the first vPort.

11. The PE according to claim 7, wherein searching the forwarding table for the second forwarding entry matching the destination MAC address of the packet and the VLAN identifier of the VLAN to which the packet belongs comprises:
  searching, by the forwarding chip, the forwarding table for a second forwarding entry matching the destination MAC address of the packet and the VLAN identifier associated with the first vPort in response to the receiving port being a first user port; or
  searching, by the forwarding chip, the forwarding table for a second forwarding entry matching the destination MAC address of the packet and the VLAN identifier in a second tag carried in the packet in response to the receiving port being a cascade port, wherein the second tag carries the VLAN identifier associated with the first vPort.

12. The PE according to claim 7, wherein the forwarding entry adding condition comprises any one or more of the following:
  there is no forwarding entry in which the MAC address is the source MAC address of the packet in the forwarding table; or
  the receiving port is a user port, and the forwarding entry in which the MAC address is the source MAC address of the packet in the forwarding table is learned from a packet received through an upstream port.

* * * * *